United States Patent Office 3,595,912
Patented July 27, 1971

3,595,912
PROCESS FOR REMOVING ALLOTHREONINE
Yasuo Ariyoshi, Kanagawa-ken, and Naotake Sato, Tokyo, Japan, assignors to Ajinomoto Co., Inc., Tokyo, Japan
Filed Aug. 29, 1969, Ser. No. 854,169
Claims priority, application Japan, Sept. 4, 1968, 43/63,560
Int. Cl. C07c 101/30, 143/30, 143/56
U.S. Cl. 260—534M          3 Claims

ABSTRACT OF THE DISCLOSURE

Threonine can be purified of accompanying allothreonine by precipitation of allothreonine from a common aqueous solution as an insoluble addition compound with 5-nitronaphthalene-1-sulfonic acid, 6- or 8-chloronaphthalene-2-sulfonic acid, anthraquinone-$\beta$-sulfonic acid, H-acid, o-sulfobenzoic acid, tetrachlorophthalic acid, 3,6-dichlorophthalic acid, tetrabromophthalic acid, $\alpha$-naphthylphosphoric acid, or chlorendic acid. Little, if any, threonine is precipitated.

---

This invention relates to the precipitation of allothreonine from its aqueous solutions and particularly to the removal of allothreonine from threonine solutions.

Threonine is a known food supplement. When produced synthetically, it is accompanied by allothreonine as a contaminant. Known procedures for removing allothreonine from threonine, such as that disclosed in Pat. No. 2,461,847, are relatively complex and not suitable for industrial application.

The object of the invention is a method of removing allothreonine from threonine solutions simply and at low cost.

It has been found that allothreonine and certain organic acids form addition compounds which are only sparingly soluble in water and precipitated from common solutions of threonine and allothreonine when one of the acids is added. Threonine does not readily form corresponding addition compounds.

The following acids have been found to be effective precipitation reagents for allothreonine:

5-nitronaphthalene-1-sulfonic acid
8-chloronaphthalene-2-sulfonic acid
6-chloronaphthalene-2-sulfonic acid
anthraquinone-$\beta$-sulfonic acid
1-naphthol-8-amino-3,6-disulfonic acid (H acid)
o-sulfobenzoic acid
tetrachlorophthalic acid
3,6-dichlorophthalic acid
tetrabromophthalic acid
$\alpha$-naphthylphosphoric acid
1,4,5,6,7,7-hexachloro-endo-bicyclo[2.2.1]hept-5-ene-2,3-dicarboxylic acid (chlorendic acid)

The following examples illustrate the formation of precipitates from aqueous solutions of allothreonine with the reagents of the invention:

EXAMPLE 1

6.3 g. tetrachlorophthalic acid were added to 20 ml. of an aqueous solution of 2 g. DL-allothreonine. The mixture was stirred at room temperature for five hours and then stored overnight in a refrigerator. The resulting crystalline precipitate was collected by filtration and weighed 6.5 g. Recrystallization from aqueous methanol yielded small, plate-like crystals melting at 117° C.

The material was identified as DL-allothreonine-tetrachlorophthalic acid dihydrate by elementary analysis.

Calculated for $C_{12}H_{11}O_7NCl_4.2H_2O$ (percent): 31.39, C; 3.29, H; 3.05, N; 30.89, Cl. Found (percent): 31.65, C; 3.08, H; 3.06, N; 30.77, Cl.

Figure 1:
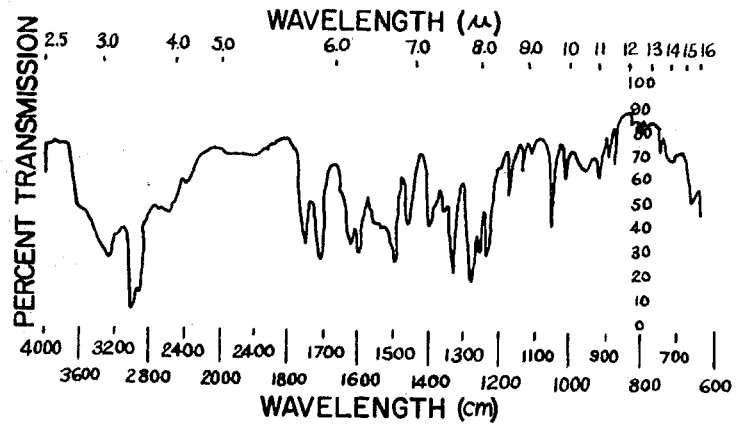

The infrared absorption spectrum of the crystals as determined by the Nujol mull technique is shown in FIG. 1.

EXAMPLE 2

When 5.0 g. 5-nitronaphthalene-1-sulfonic acid were substituted for the tetrachlorophthalic acid in the procedure of Example 1, a precipitate weighing 3.5 g. was obtained. When the product was recrystallized from aqueous methanol, small, plate-like crystals melting at 224°–225° C. (decomp.) were obtained and identified as DL-allothreonine-5-nirtonaphthalene-1-sulfonic acid by elementary analysis:

Calculated for $C_{14}H_{16}O_8N_2S$ (percent): 45.16, C; 4.33, H; 7.52, N; 8.61, S. Found (percent): 45.26, C; 4.18, H; 7.40, N; 8.47, S.

Figure 2:
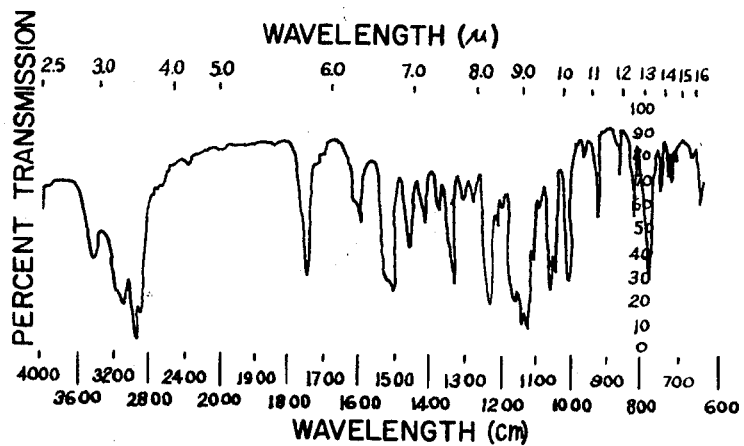

The infrared absorption spectrum of the crystals is shown in FIG. 2.

EXAMPLE 3

5.4 g. disodium $\alpha$-naphthyl phosphate were dissolved in 20 ml. 2 N hydrochloric acid. 2.0 g. DL-allothreonine were added, and the mixture was stirred at room temperature for five hours and stored overnight in a refrigerator. A crystalline precipitate was collected by filtration and weighed 4.5 g. When recrystallized from aqueous methanol, the material formed small, pillar-shaped crystals melting at 189°–190° C. (decomp.). It was identified as an addition compound of DL-allothreonine with $\alpha$-naphthylphosphoric acid by elementary analysis:

Calculated for $C_{14}H_{18}O_7NP$ (percent): 48.98, C; 5.29, H; 4.08, N; 9.02, P. Found (percent): 49.11, C; 5.25, H; 3.95, N; 8.71, P.

Figure 3:
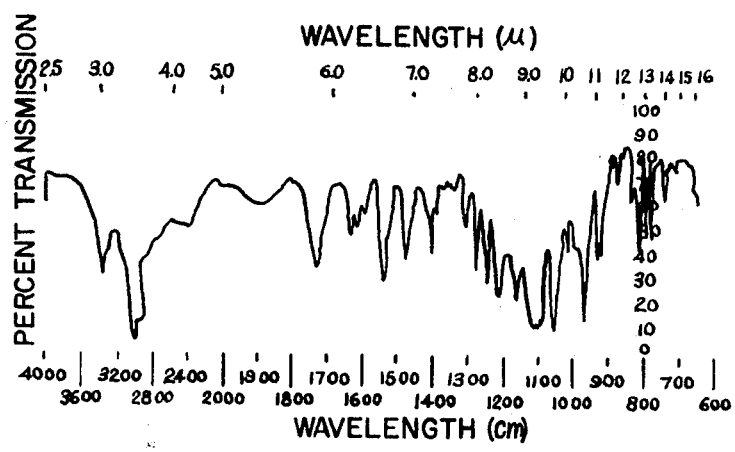

The infrared absorption spectum (Nujol mull) is shown in FIG. 3.

When one of the afore-listed precipitation reagents is added to an aqueous solution of allothreonine and threonine or to the mixture of 2-amino-3-hydrobutyric acids obtained by synthesis, the sparingly soluble addition compound of allothreonine is precipitated and may thereby be separated from the other stereoisomers. The optically active and racemic forms of allothreonine are equally precipitated.

The amount of precipitation reagent used is not critical. Two mols chlorendic acid per mol allothreonine are required and at least one mol of each of the other reagent is adequate. Too large an excess of reagent is undesirable because the excessive reagent may in some instances precipitate an addition compound with threonine.

The precipitation reagents may be employed not only as the free acids, but also in the form of their water soluble salts, such as the ammonium alkali metal salts (sodium salts). Tetrachlorophthalic acid, 3,6-dichlorophthalic acid, tetrabromophthalic acid, and chlorendic acid may also be used as the anhydrides which are hydrolyzed to the acids during the reaction leading to the addition compounds.

A pH adjustment is unnecessary when the precipitation reagents are added as the free acids to a solution containing free threonine and allothreonine. Adjustment to a value depending on the specific reagent is needed for highest yields when the reagents are used in the form of their salts. The sulfonic acids and phosphoric acid derivatives are preferably used at pH 2 or less. For salts of the carboxylic acids, the pH should be adjusted to 2–7, preferably 2–4. Mineral acids, alkali metal hydroxides, carbonates or bicarbonates are used in the usual manner for pH adjustment.

Water and mixtures of water with organic solvents are used as reaction media, for example, aqueous lower alkanols and aqueous lower alkanones. The precipitated addition compounds are separated from the liquid phase by any conventional method, as by filtering, centrifuging or decanting.

When the addition compounds prepared from reagents which are carboxylic acids are kept in an acidic medium at pH below 2, the precipitation reagent is split off and precipitated. and may be recovered. When the reagent employed is a sulfonic acid or a phosphoric acid derivative, and the addition compound is mixed with a strongly acidic aqueous medium or an alkali metal hydroxide or barium hydroxide solution, the addition compound is decomposed, and the free acid/or the salt of the reagent is precipitated and may be used again. When the addition compound with a sulfonic acid or a phosphoric acid derivative is dissolved in much hot water, and the hot solution is brought into contact with a strongly acidic ion exchange resin in the H-form, only the allothreonine is adsorbed, and the reagent may be recovered from the solution for re-use.

The following additional examples further illustrate the invention.

EXAMPLE 4

14.5 g. 5-nitronaphthalene-1-sulfonic acid were added to 50 ml. of a solution of 5.0 g. each of DL-allothreonine and DL-threonine in water. The mixture was stirred at room temperature for five hours and stored overnight at 5° C. The precipitate was removed by filtering.

A sample of the filtrate was diluted with 19 volumes of water, and 15 μl. of the diluted solution were spotted on filter paper and developed by the descending method with n-butyl alcohol:methylethylketone:concentrated ammonium hydroxide solution: water (5:3:1:1). The paper was stained with cadmium-ninhydrin [J. Heilmann et al., Z. Physiol. Chem., 309, 219 (1957)], the stained spots were eluted with methanol, and the absorbencies of the eluates were measured at 510 μm.

From the results, it was calculated that 62% of the original allothreonine and only 7% of the original threonine had been precipitated.

EXAMPLE 5

9.4 g. disodium α-naphthylphosphate were added to 50 ml. of an aqueous solution of 2.5 g. DL-allothreonine, 7.0 g. threonine, and 5.8 ml. concentrated hydrochloric acid. The mixture had an approximate pH of 1. It was stirred at room temperature for 4 hours and stored overnight at 5° C. the precipitate was removed by filterring, and the filtrate was analyzed as in Example 3. It contained 6.4 g. threonine, but only 0.9 g. allothreonine.

EXAMPLE 6

23 g. chlorendic acid were added to 100 ml. of an aqueous solution of 3.5 g. DL-allothreonine and 7.0 g. DL-threonine. The mixture was stirred at room temperature for 5 hours and stored at 5° C. overnight. When the precipitate was removed, and the filtrate was analyzed as in Example 3, 6.9 g. threonine and 1.7 g. allothreonine were found.

EXAMPLE 7

When 15.6 g. tetrachlorophthalic acid were substituted for the 5-nitronaphthalene-1-sulfonic acid in the procedure of Example 3, 98% of the threonine (4.9 g.) and 6% of the allothreonine (0.3 g.) were found in the filtrate.

When the initial amount of allothreonine and threonine was reduced in the same procedure to 2.5 g. each, and the sample was diluted with 9 volumes of water instead of 19, the filtrate was found to contain 2.5 g. (100%) threonine and only 0.1 g. (4%) allothreonine.

EXAMPLE 8

28.6 g. tetrachlorophthalic anhydride were added to 50 ml. of an aqueous solution of 5.0 g. each of DL-allothreonine and DL-threonine. The mixture was stirred at 60° C. for five hours, and then stored overnight at 5° C. The precipitate was removed, and the filtrate was analyzed as in Example 3. It still contained 0.3 g. allothreonine and 4.0 g. threonine.

EXAMPLE 9

3.1 g. tetrachlorophthalic acid were added to 15 ml. of an aqueous solution of 1.0 g. each of D-allothreonine and D-threonine. The mixture was agitated at room temperature for five hours and stored overnight at 5° C. The precipitate was removed by filtering, and the filtrate was analyzed as in Example 3. It contained 0.1 g. D-allothreonine and 1.0 g. D-threonine.

EXAMPLE 10

The precipitation agents listed in Table 1 were added to 100 ml. batches of an aqueous solution containing 10 g. each of DL-allothreonine and DL-threonine in an excess of 20 mol percent over the allothreonine present. An equivalent amount of hydrochloric acid was used with the reagents which are sodium or ammonium salts. Each mixture was stirred at room temperature for five hours, stored overnight at 5° C. and filtered. The filtrates were analyzed as in Example 1.

The amounts of allothreonine removed in the several addition compounds were calculated and are listed in Table 1. Less than 10% threonine was precipitated in each case.

TABLE 1

| Precipitation agent: | Percent Allothreonine Removed |
|---|---|
| 3,6-dichlorophthalic acid | 53 |
| Tetrabromophthalic acid | 45 |
| Sodium anthraquinone-β-sulfonate | 46 |
| Sodium 8-chloronaphthalene-2-sulfonate | 64 |
| Sodium 6-chloronaphthalene-2-sulfonate | 44 |
| Ammonium o-sulfobenzoate | 36 |
| H acid | 30 |

EXAMPLE 11

30 ml. 80% acetaldehyde were added with stirring to a solution of 23.0 g. copper glycinate and 1.0 g. sodium hydroxide in 60 ml. water. The mixture was stirred for one hour at 50° C., whereupon 40 ml. water and 70 ml. concentrated ammonium hydroxide solution were added, and the resulting mixture was passed over a column of a strongly acidic cation exchange resin (Dowex 50W) pretreated with ammonia. The effluent was evaporated in a vacuum to a small volume, and excess methanol was added.

After standing overnight at 50° C., 16.6 g. crystals were recovered. They were analyzed as in Example 3 and found to contain 10.3 g. threonine, 5.5 g. allothreonine, and 0.2 g. glycine.

16.0 grams of the crystals were dissolved in 100 ml. water, and 16.4 g. tetrachlorophthalic acid were added with stirring which was continued for five hours, whereupon the mixture was stored overnight at 5° C. The precipitate was filtered off, washed with 20 ml. cold water, and dried. 19.0 g. allothreonine-tetrachlorophthalic acid addition compound were obtained.

The combined filtrate and washings were adjusted from pH 2.65 to pH 1.35 with concentrated hydrochloric acid, whereby crystalline tetrachlorophthalic acid was precipitated. When collected by filtration, washed with 5 ml. water and dried, the recovered reagent weighed 2.9 g.

The combined mother liquor and washings were passed over a column of Dowex 50W in the H-form. The column was washed with water, and the amino acids were then eluted with 2 N aqueous ammonium hydroxide. The eluate was evaporated in a vacuum until crystals formed whereupon an excess of methanol was added. After overnight storage at 5° C., the crystals were collected by filtration, washed with methanol, and dried. They weighed 10.0 g.

When analyzed as in Example 3, they were found to contain threonine and allothereonine in a ratio of 95:5.

The 19.0 g. of addition compound were suspended in 6.9 ml. concentrated hydrochloric acid diluted with 95 ml. water, and the suspension was boiled for 30 minutes, and then stored at 5° C. for three hours. The precipitated crystals of tetrachlorophthalic acid were filtered off, washed with 15 ml. water and dried. They weighed 12.8 g. for a total recovery of 15.7 g. (96%) of the reagent.

The mother liquor and washings were passed over a column of Dowex 50W (H-form), and the column was washed with water and eluted with 2 N aqueous ammonium hydroxide. The eluate was worked up as described above and yielded 4.6 g. crystals containing allothreonine and threonine in a ratio of 97.3.

What is claimed is:

1. A method of removing allothreonine from an aqueous solution thereof which comprises adding to said solution a reagent selected from the group consisting of 5-nitronaphthalene-1-sulfonic acid, 8-chloronaphthalene-2-sulfonic acid, 6-chloronaphthalene-2-sulfonic acid, anthraquinone-$\beta$-sulfonic acid, H acid, o-sulfobenzoic acid, tetrachlorophthalic acid, 3,6-dichlorophthalic acid, tetrabromophthalic acid, $\alpha$-naphthylphosphoric acid, and chlorendic acid, in an amount sufficient to cause precipitation of an addition compound of said allothreonine and of said reagent; and separating said addition compound from the remaining liquid.

2. A method as set forth in claim 1, wherein said aqueous solution contains a stereoisomer of 2-amino-3-hydroxybutyric acid other than allothreonine, said reagent being added to said solution in an amount to leave said other stereoisomer substantially in said solution during said precipitation of said addition compound.

3. A method as set forth in claim 2, wherein said other stereoisomer is threonine.

References Cited
UNITED STATES PATENTS

| 2,461,847 | 2/1949 | Shabeca et al. | 260—534M |
| 2,681,927 | 6/1954 | McCollum et al. | 260—501.11 |

JAMES A. PATTEN, Primary Examiner

J. L. DAVISON, Assistant Examiner

U.S. Cl. X.R.

260—372, 501.11, 501.12